United States Patent

Kawai

(10) Patent No.: US 6,842,275 B2
(45) Date of Patent: Jan. 11, 2005

(54) ELECTROPHORETIC DISPERSION, ELECTROPHORETIC DEVICE, AND ELECTRONIC DEVICE

(75) Inventor: Hideyuki Kawai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/391,643

(22) Filed: Mar. 20, 2003

(65) Prior Publication Data

US 2003/0227665 A1 Dec. 11, 2003

(30) Foreign Application Priority Data

Mar. 26, 2002 (JP) .......................... 2002-085931

(51) Int. Cl.$^7$ .............................. G02F 1/19; G02B 26/00
(52) U.S. Cl. ........................................ 359/265; 359/296
(58) Field of Search .............................. 359/265, 253, 359/296, 452; 430/19, 35, 38; 345/107; 204/469, 622

(56) References Cited

U.S. PATENT DOCUMENTS 6,373,461 B1 * 4/2002 Hasegawa et al. .......... 345/107
6,400,492 B1 * 6/2002 Morita et al. .............. 359/296

FOREIGN PATENT DOCUMENTS

| JP | 48-31097 | 4/1973 |
| JP | 51-86075 | 7/1976 |
| JP | A-64-86116 | 3/1989 |
| JP | A-2-24633 | 1/1990 |
| JP | 05-228359 | 9/1993 |
| JP | 08-089789 | 4/1996 |
| JP | A-10-149118 | 6/1998 |
| JP | A-2000-227612 | 8/2000 |

* cited by examiner

Primary Examiner—Scott J. Sugarman
Assistant Examiner—Richard Hanig
(74) Attorney, Agent, or Firm—Oliff & Berridge, PLC (57) ABSTRACT

The invention provide an electrophoretic dispersion, used for electrophoretic devices, containing electrophoretic particles having a density precisely adjusted by a simple method in order to prevent the settlement of the electrophoretic particles. An electrophoretic dispersion can include a liquid dispersion media and electrophoretic particles, dispersed in the liquid dispersion media, including at least a coloring portion, a resin portion, and a plurality of hollow microcapsules. The electrophoretic particles can further include charge control portions according to needs.

7 Claims, 7 Drawing Sheets

ELECTROPHORETIC DISPERSION, ELECTROPHORETIC DEVICE, AND ELECTRONIC DEVICE

BACKGROUND OF THE INVENTION

1. Field of Invention

The present invention relates to an electrophoretic dispersion and electrophoretic devices including the same. The present invention particularly relates to an electrophoretic dispersion containing a liquid dispersion medium and electrophoretic particles, dispersed in the medium, including at least coloring means and a resin portion and relates to an electrophoretic device including a pair of electrodes and the electrophoretic dispersion disposed between the electrodes.

2. Description of Related Art

Conventionally, electrophoretic display systems including electrophoretic devices are known. The electrophoretic devices each include a pair of electrodes and an electrophoretic dispersion disposed between the electrodes, wherein the electrophoretic dispersion contains a liquid dispersion medium and electrophoretic particles. In such electrophoretic devices, the distribution of the electrophoretic particles is changed when a voltage is applied between the electrodes. The electrophoretic display systems display an image using such a phenomenon.

Each electrophoretic display system includes the electrophoretic devices each including a pair of substrates and an electrophoretic dispersion placed between the substrates, wherein at least one of the substrates comprises a transparent material, the substrates have a predetermined distance therebetween, and the electrophoretic dispersion contains at least a liquid dispersion medium and electrophoretic particles having a surface charge. When a voltage is applied between the substrates, the electrophoretic particles electrophoretically migrate depending on the surface charge and the direction of the electric field, thereby changing the distribution of the electrophoretic particles. Therefore, the color of the electrophoretic device is changed when viewed from the transparent substrate side. Thus, a desired image can be displayed by controlling the amount of a voltage being applied.

Such an electrophoretic display system is disclosed in Japanese Unexamined Patent Application Publication No. 1-86116. The electrophoretic display system includes a pair of substrates and microcapsules, disposed therebetween, containing an electrophoretic dispersion. The electrophoretic dispersion contained in the microcapsules can be easily handled. However, in the above electrophoretic display system, there is a problem in that electrophoretic particles are settled due to a large difference in density between the liquid dispersion media and the electrophoretic particles. In order to solve such a problem, the following method is provided: electrophoretic particles having cavities therein are used for obtaining a small difference in density between the liquid dispersion media and the electrophoretic particles, thereby preventing the settlement.

For example, a capsule electrophoretic particle of a microballoon type is disclosed in Japanese Unexamined Patent Application Publication No. 48-31097, wherein the particle contains gas.

The following technique is disclosed in Japanese Unexamined Patent Application Publication No. 2-24633: a core for electrophoretic particles is formed using a porous organic material and the core is coated with an inorganic material, thereby adjusting the density.

Furthermore, techniques relating to the following particles are disclosed in Japanese Unexamined Patent Application Publication 2000-227612: a fine particle having a pigment component thereon and cavities therein, another fine particle including a pigment component thereon and a hollow organic polymer, and another fine particle including a pigment component having cavities therein.

However, in these conventional techniques, there is a problem in that it is difficult to control the number and the volume of cavities in each electrophoretic particle and therefore it is difficult to minutely control the density of the electrophoretic particle with preciseness. That is, since the microbaloon-type capsule particle and the particle including the pigment component thereon and the hollow organic polymer have a single cavity, the conditions of the manufacturing steps must be precisely adjusted in order to minutely control the density of the particles with preciseness. Furthermore, in the particle having the core comprising porous organic material, it is difficult to control the number and the total volume of cavities in the organic material in the manufacturing steps.

SUMMARY OF THE INVENTION

[Problems to be Solved by the Invention]

The present invention has been made in order to solve the above problems. It is an object of the present invention to provide an electrophoretic dispersion in which the settlement of electrophoretic particles is prevented, wherein the electrophoretic particles have a density precisely controlled by a simple method.

It is another object of the present invention to provide an electrophoretic device that includes the electrophoretic dispersion, in which the settlement of electrophoretic particles is prevented, and that can display a stable image for a long period.

[Means for Solving the Problems]

In order to solve the above problems of the conventional techniques and achieve the above object, an electrophoretic dispersion of the present invention includes a liquid dispersion media and electrophoretic particles, dispersed in the liquid dispersion media, including at least coloring means, a resin portion, and a plurality of hollow microcapsules.

According to the present invention, the content of the hollow microcapsules can be controlled and/or the number of the hollow microcapsules contained in the electrophoretic particles can be controlled to precisely adjust the density of the electrophoretic particles in a simple manner.

In the electrophoretic dispersion of the present invention, the electrophoretic particles further include charge control portions.

In the electrophoretic dispersion, the electrophoretic particles consist of at least first and second particles, and at least one of the group consisting of the color of the coloring means, the material of the resin portion, and the kind of the charge control portions of the first particles is different from that of the second particles.

In the electrophoretic dispersion, the hollow microcapsules have the same function as that of the coloring means.

An electrophoretic device according to the present invention includes a pair of electrodes and an electrophoretic dispersion, disposed between the electrodes.

An electrophoretic device according to the present invention includes a pair of electrodes and microcapsules, disposed between the electrodes, containing an electrophoretic dispersion.

DETAILED DESCRIPTION OF PREFERRED EMBODIMENTS

The embodiments of the present invention will now be described with reference to the accompanying drawings.

Figure 1:
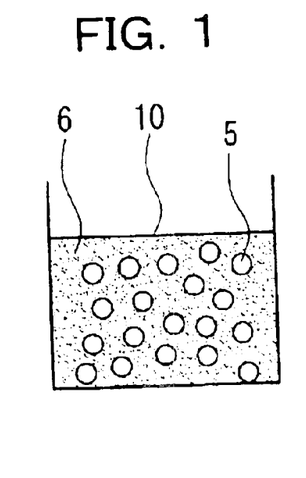
FIG. 1 is an illustration showing a configuration of an electrophoretic dispersion according to the present invention.

As shown in FIG. 1, an electrophoretic dispersion 10 of the present invention contains at least a liquid dispersion media 6 and a plurality of electrophoretic particles 5 dispersed therein.

Figure 2:
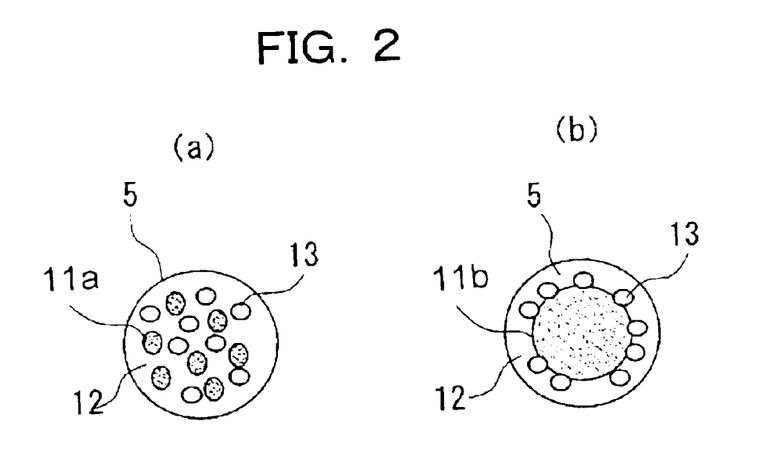
FIG. 2 is an illustration showing a configuration of electrophoretic particles according to the present invention.

Each electrophoretic particle 5 includes at least first coloring means 11a, a resin portion 12 for adsorbing the first coloring means 1a, and a plurality of hollow microcapsules 13. In this embodiment, the electrophoretic particle 5 shown in FIG. 2(a) includes a plurality of the first coloring means 1a and a plurality of the hollow microcapsules 13, which are uniformly distributed in the electrophoretic particle 5. On the other hand, in another embodiment, the electrophoretic particle 5 shown in FIG. 2(b) may include a single second coloring means 11b surrounded by a plurality of the hollow microcapsules 13.

The liquid dispersion media 6 includes high-insulation organic solvents. These solvents include aromatic hydrocarbons such as toluene, xylenes, and alkylbenzenes; aliphatic hydrocarbons such as pentane, hexane, and octane; alicyclic hydrocarbons such as cyclohexane and methyl cyclohexane; halogenated hydrocarbons such as methylene chloride, chloroform, carbon tetrachloride, and 1,2-dichloroethane; mineral oil such as silicon oil and fluorocarbon oil; vegetable oil such as olive oil; and long-chain fatty acid esters. These solvents may be used alone or in combination.

The first coloring means 11a may comprise an organic or inorganic pigment particle or the mixture thereof. The organic or inorganic pigment particle includes black pigments such as aniline black and carbon black; white pigments such as titanium dioxide, hydrozincite, and antimony trioxide; azo pigments such as a mono azo pigment, a disazo pigment, and a polyazo pigment; yellow pigments such as isoindolinone, chrome yellow, yellow oxide, cadmium yellow, titanium yellow, and antimony; red pigments such as quinacridone red and chrome vermilion red; blue pigments such as phthalocyanine blue, indanthrene blue, an anthraquinone dye, prussian blue, ultramarine blue, and cobalt blue; and green pigments such as phthalocyanine green. These pigments can be used alone or in combination. These pigments may further contain a charge control agent containing an electrolyte, a surfactant, metal soap, a resin, gum, oil, varnish, and compound particles; a dispersant such as a titanium-coupling agent, an aluminum-coupling agent, and a silane-coupling agent; a lubricant; a stabilizing agent; and the like, according to needs. Furthermore, various dyes may be used for the first coloring means 11a.

The resin portion 12 is not limited and may comprise any resin as long as the resin adsorbs the first coloring means 11a, is dispersed in the liquid dispersion media 6, and has insulating properties. Such a resin includes, for example, polyethylene, polystyrene, polyesters, phenol resins, acrylic resins, and an ethylene-butyl acetate copolymer.

Figure 3:
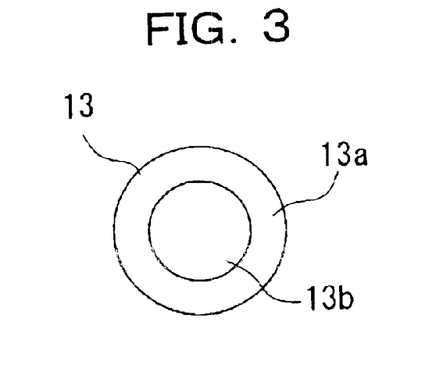
FIG. 3 is an illustration showing a configuration of hollow microcapsules according to the present invention.

Each hollow microcapsule 13 is an organic or inorganic particulate matter containing a gas such as air. As shown in FIG. 3, the hollow microcapsule 13 includes a microcapsule film 13a and a gas portion 13b covered with the microcapsule film 13a.

The hollow microcapsules 13 according to present invention can be manufactured by known manufacturing methods.

Among the manufacturing methods, the following method is disclosed in Japanese Unexamined Patent Application Publication No. 51-86075: water-in-oil emulsion containing an inorganic aqueous solution and an organic solvent is caused to react with another inorganic aqueous solution by an interfacial reaction process to form hollow inorganic particles.

Furthermore, the following method is disclosed in Japanese Unexamined Patent Application Publication No. 8-89789: a water self-dispersible resin and a hydrophobic material having no compatibility with the water self-dispersible resin are mixed in an organic solvent, in which the water self-dispersible resin is soluble, to prepare a mixed solution; the mixed solution is poured in water to induce phase-inversion emulsification to form particles in which the hydrophobic material is covered with the water self-dispersible resin; the hydrophobic material is extracted from the particles using an organic solvent that do not have the dissolubility of the water self-dispersible resin, can pass through the water self-dispersible resin, and have the dissolubility of the hydrophobic material; and the resulting particles are then dried to form hollow particles.

Furthermore, the following method is disclosed in Japanese Unexamined Patent Application Publication No. 5-228359: emulsion prepared under pressurized condition is placed under atmospheric pressure to generate gas in liquid particles to form hollow particles.

Hollow microcapsules manufactured according to the above methods have been marketed by some companies. In particular, such hollow microcapsules include SX866(A) manufactured by JSR Corporation, hollow particle emulsion manufactured by ZEON Corporation, and so on.

A method for manufacturing the electrophoretic particles 5 having the first coloring means 1a, resin portion 12, and a plurality of the hollow microcapsules 13 includes the following methods: a suspension polymerization method in which colorant and hollow capsules are dispersed in a resin prepolymer to form emulsion, the emulsion is poured in water, and the polymerization is then performed; a heteroaggregation method in which the heteroaggregation of colorant particles and hollow microcapsules is caused in a solution; and a phase separation method in which colorant particles and hollow microcapsules are dispersed in a solvent containing a resin, the heteroaggregation of the colorant particles and the hollow microcapsules is caused to form cores, and the cores are then settled.

In a step of a method for manufacturing the electrophoretic particles 5, in order to improve the affinity among the first coloring means 11a, resin portion 12, and the hollow microcapsules 13, surfactant is preferably used and the first coloring means 11a and the hollow microcapsules 13 are preferably surface-treated.

Before the electrophoretic particles 5 are manufactured, the density of the first coloring means 11a, resin portion 12, and the hollow microcapsules 13 must be known. When these components are combined at an appropriate ratio, the electrophoretic particles 5 having a desired density can be readily manufactured with preciseness. That is, in a step of a method for manufacturing the electrophoretic particles 5, the content of the hollow microcapsules 13 is controlled to adjust the number of the hollow microcapsules 13, that is, the number of cavities, contained in each electrophoretic particle 5.

When white electrophoretic particles are manufactured, white hollow microcapsules may be used, thereby improving the whiteness degree using light scattering in the hollow microcapsules.

Figure 4:
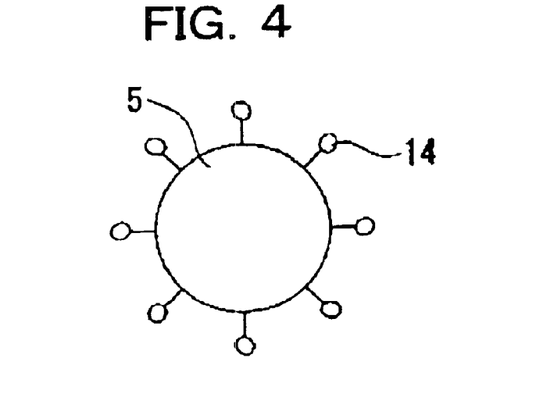
FIG. 4 is an illustration showing a configuration of electrophoretic particles according to the present invention, wherein the electrophoretic particles includes charge control portions.

As shown in FIG. 4, the electrophoretic particles 5 may further include charge control portions 14. When the charge control portions 14 comprise an appropriate charge control agent, the electrophoretic particles 5 have desired polarity and a desired quantity of charge, thereby obtaining superior electrophoretic properties. Various charge control agents are known. Charge control agents for providing positive charge include metal salts such as naphthenates, octylates, and stearates; ethylenediamine tetraacetate metal complexes; and so on. Charge control agents for providing negative charge include calcium alkylbenzene sulfonate, calcium dioctyl sulfonate, sodium dioctyl sulfonate, zinc phosphate, and so on.

The electrophoretic particles 5 may consist of at least first and second particles, wherein at least one of the group consisting of the color of the coloring means, the material of the resin portion, and the kind of the charge control portions of the first particles is different from that of the second particles. When the electrophoretic particles 5 consist of two or more types of particles, a grayshaded or color image can be displayed, that is, display variations can be increased.

Figure 5:
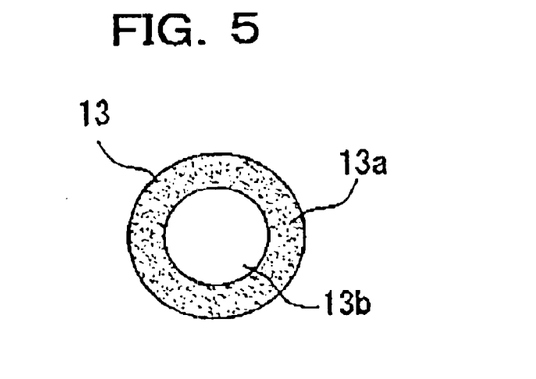
FIG. 5 is an illustration showing a configuration of hollow microcapsules according to the present invention, wherein the hollow microcapsules have the same function of the coloring means.

In the above description, each electrophoretic particle 5 includes the first coloring means 11a and the hollow microcapsules 13. The electrophoretic particle 5 may include components each having the same functions as those of the first coloring means 11a and the hollow microcapsules 13. For example, as shown in FIG. 5, when each hollow microcapsule 13 includes a colored microcapsule film 13a, the hollow microcapsule 13 has the same function as that of the first coloring means 11a in addition to the own function.

Figure 6:
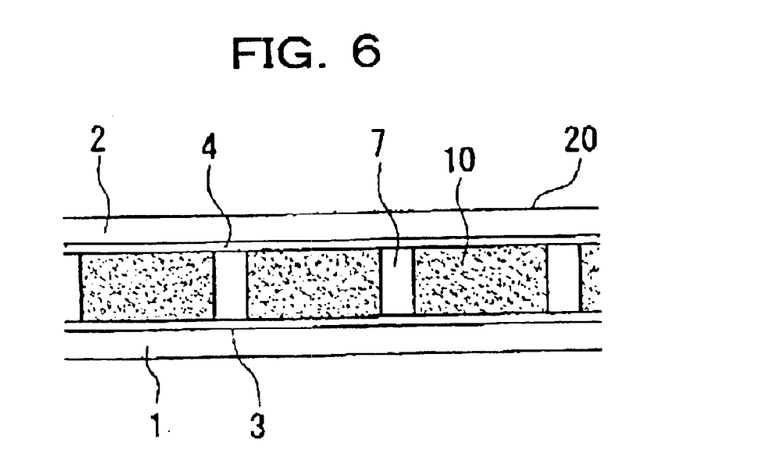
FIG. 6 is an illustration showing an electrophoretic device according to a first embodiment of the present invention.

An electrophoretic device 20 according to a first embodiment of the present invention is shown in FIG. 6. The electrophoretic device 20 includes first and second substrates 1 and 2, spacers 7, a transparent electrode 4, an electrode 3, and an electrophoretic dispersion 10. The spacers 7 are disposed between the first and second substrates 1 and 2 so as to provide a predetermined distance therebetween. The second substrate 2 comprises, for example, a transparent material such as transparent glass or a transparent film. The transparent electrode 4 is disposed under the lower surface of the second substrate 2, the lower surface facing the first substrate 1. The transparent electrode 4 comprises, for example, indium tin oxide (ITO).

The first substrate 1 may not be transparent and may comprise, for example, glass or a film. The electrode 3 is disposed on the upper surface of the first substrate 1, the upper surface facing the second substrate 2. The electrode 3 may not be transparent and may comprise, for example, ITO.

The spacers 7 further has the function of sealing spaces surrounded by the electrode 3, the transparent electrode 4, and the spacers 7 and comprises, for example, a sealing material such as a epoxy resin. The spacers 7 usually has a length of about 20 mm to 1 mm and this length corresponds to the distance between the electrode 3 and the transparent electrode 4.

An electrophoretic dispersion 10 is disposed in the spaces surrounded by the electrode 3, the transparent electrode 4, and the spacers 7. When an appropriate voltage is applied between the electrode 3 and the transparent electrode 4, a desired image can be displayed.

Figure 7:
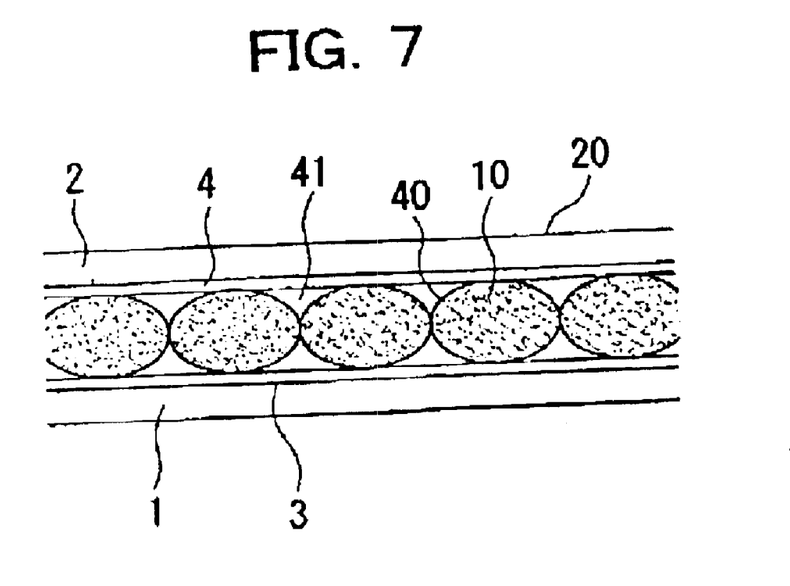
FIG. 7 is an illustration showing an electrophoretic device according to a second embodiment of the present invention.

An electrophoretic device 20 according to a second embodiment of the present invention is shown in FIG. 7. The electrophoretic device 20 of this embodiment includes first and second substrates 1 and 2, and microcapsules 40, disposed therebetween, containing the electrophoretic dispersion 10.

The microcapsules 40 may comprise gelatin, a urethane resin, a urea resin, or the like. The microcapsules 40 may be prepared by a known method such as an interfacial polymerization method, an in-situ polymerization method, a phase separation method, or a spray drying method. The microcapsules 40 preferably have even size in order to have superior display functions. The microcapsules 40 having even size can be obtained by a filtration method or a gravity separation method. The microcapsules 40 usually have a diameter of about 30 to 100 mm.

A microcapsule layer is disposed between the first and second substrates 1 and 2. The microcapsule layer may be formed according to the following procedure: the microcapsules 40 and a binder 41 are mixed, a dielectric constant-adjusting agent is added to the mixture according to needs, the obtained composition (emulsion or solution containing an organic solvent) is applied onto a base plate by a known method such as a roller coating method, a roller laminating method, a screen-printing method, a spraying method, or an inkjet method.

The binder 41 is not particularly limited and may comprise any resin as long as the resin has high affinity with the microcapsules 40, high adhesion to the base plate, and insulating properties. Such a resin includes, thermoplastic resins such as polyethylene, chlorinated polyethylene, an ethylene-vinyl acetate copolymer, an ethylene-ethyl acrylate copolymer, polypropylene, an ABS resin, a methyl methacrylate resin, a vinyl chloride resin, a vinyl chloride-vinyl acetate copolymer, a vinyl chloride-vinylidene chloride copolymer, a vinyl chloride-acrylic ester copolymer, a vinyl chloride-methacrylic acid copolymer, a vinyl chloride-acrylonitrile copolymer, an ethylene-vinyl alcohol-vinyl chloride copolymer, a propylene-vinyl chloride copolymer, a vinylidene chloride resin, a vinyl acetate resin, polyvinyl alcohol, polyvinyl formal, and a cellulose resin; polymers such as a polyamide resin, polyacetal, polycarbonate, polyethylene terephthalate, polybuthylene terephthalate, polyphenylene oxide, polysulfone, polyamidoimide, polyaminobismaleimide, polyethersulfone, polyphenylenesulfone, polyarylate, graft polyphenylene ether, polyetherether ketone, and polyetherimide; fluorocarbon resins such as polytetrafluoroethylene, a fluorinated ethylene-propylene copolymer, a tetrafluoroethyleneperfluoroalkoxyethylene copolymer, an ethylene-tetrafluoroethylene copolymer, polyfluorovinylidene, polytrifluorochloroethylene, and fluorocarbon rubber; silicon-containing resins such as a silicone resin and silicone rubber; and other polymers such as a methacrylate-styrene copolymer, polybutylene, and methyl methacrylate-butadiene-styrene copolymer.

The binder 41 preferably has the same dielectric constant as that of the electrophoretic dispersion 10, as disclosed in Japanese Unexamined Patent Application Publication No. 10-149118. Thus, the binder 41 preferably further comprises alcohols, ketones, and carboxylates. Such alcohols include 1,2-butanediol, 1,4-butanediol, and the like.

As described above, the electrophoretic dispersion 10 according to the present invention contains the liquid dispersion media 6 and the electrophoretic particles 5, dispersed therein, including at least the first coloring means 11a, the resin portion 12, and a plurality of the hollow microcapsules 13. The electrophoretic particle 5 further includes the charge control portions 14 according to needs. Since the electrophoretic dispersion 10 has the above configuration, the settlement of the electrophoretic particles 5 is prevented. Thus, when the electrophoretic dispersion 10 is used for display systems, a stable image can be displayed for a long time.

An electrophoretic device of the present invention can be used for various electronic devices including a display portion. Exemplary electronic devices including such an electrophoretic device of the present invention will now be described.

1. Wristwatch

Figure 8:
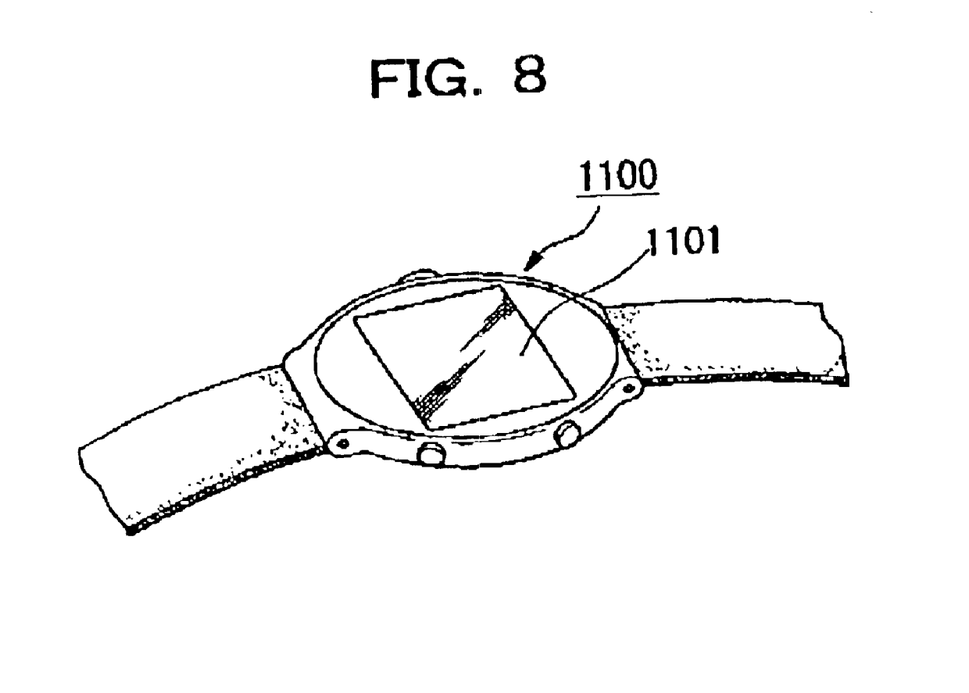
FIG. 8 is an illustration showing an electronic device including an electrophoretic device.

An exemplary wristwatch 1100 including an electrophoretic device of the present invention is illustrated below. FIG. 8 is a perspective view showing a configuration of the wristwatch 1100 equipped with a display portion 1101 including the electronic device.

2. Mobile Computer

Figure 9:
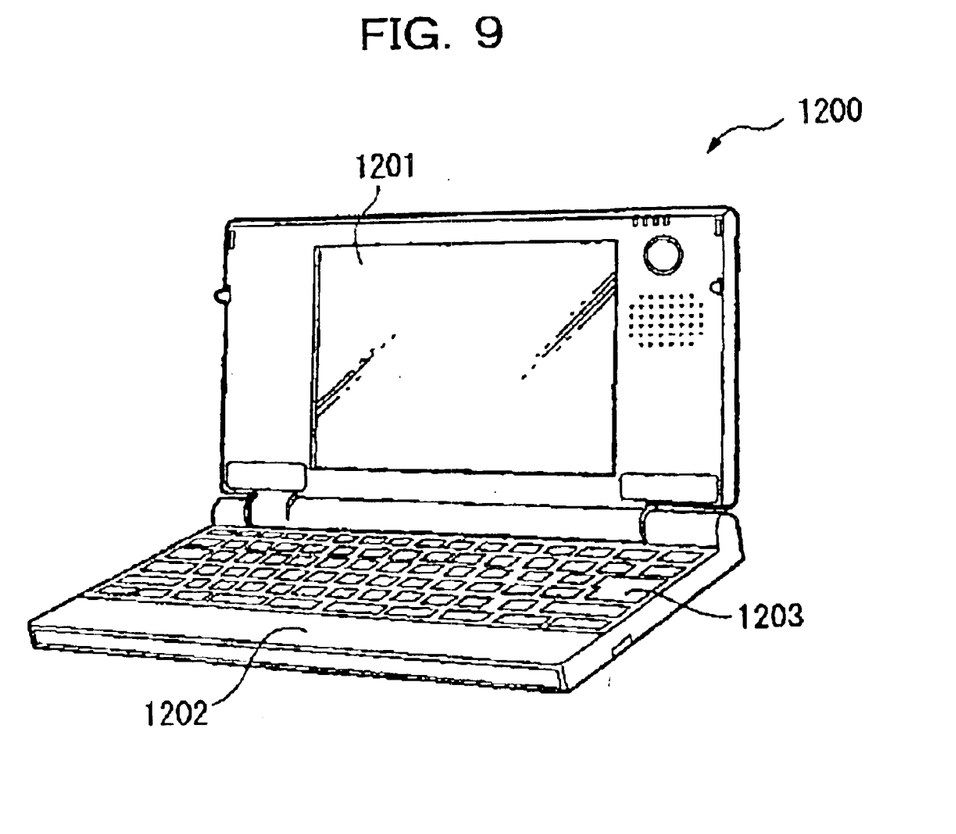
FIG. 9 is an illustration showing an electronic device including an electrophoretic device.

An exemplary mobile (portable) personal computer 1200 including an electrophoretic device of the present invention is illustrated below. FIG. 9 is a perspective view showing a configuration of the personal computer 1200 including a display portion 1201 having the electronic device. The personal computer 1200 further includes a main body 1202 equipped with a keyboard 1203.

3. Mobile Phone

Figure 10:
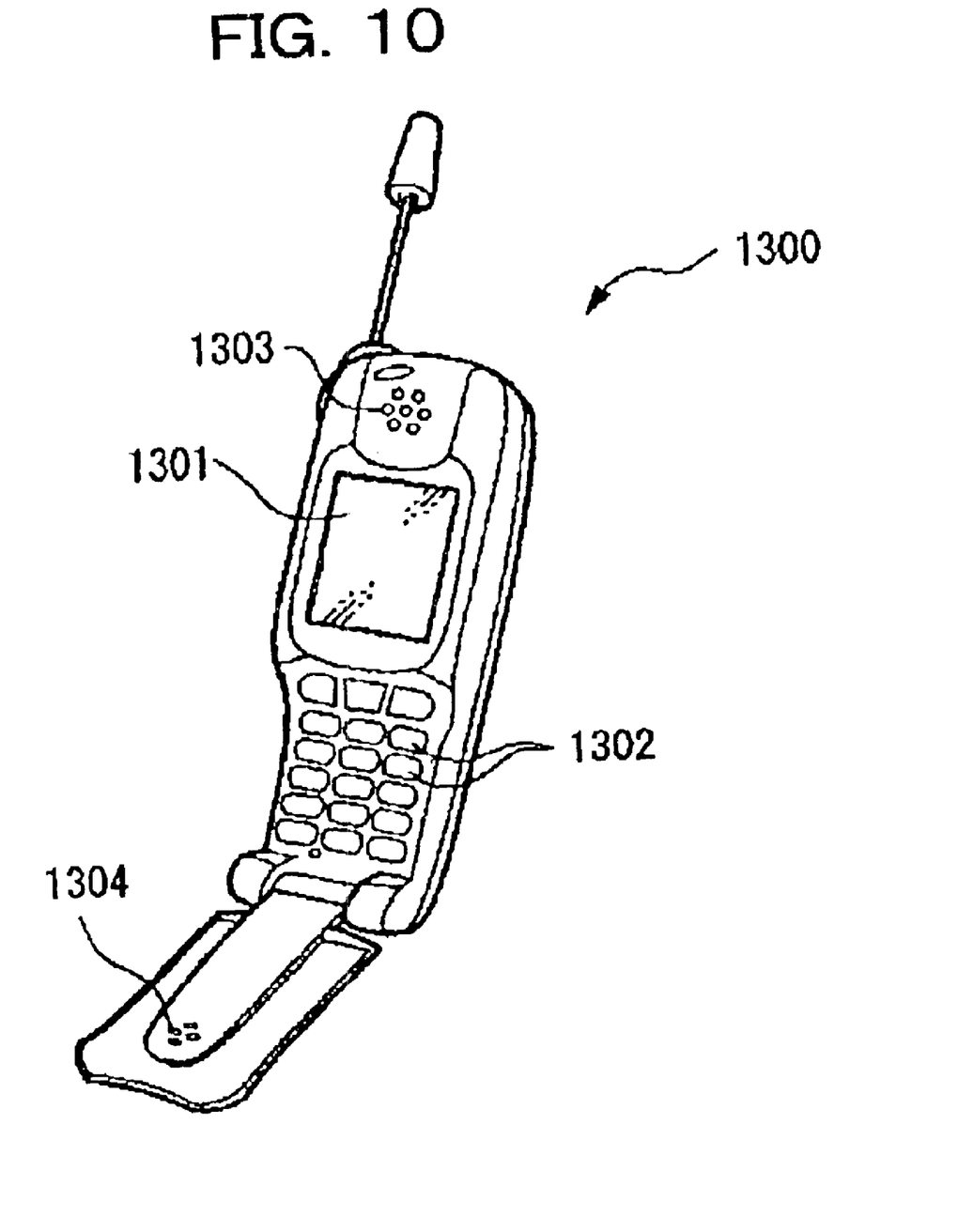
FIG. 10 is an illustration showing an electronic device including an electrophoretic device.

An exemplary mobile phone 1300 including an electrophoretic device of the present invention is illustrated below. FIG. 10 is a perspective view showing a configuration of the mobile phone 1300 including a small-sized display portion 1301 having the electronic device. The mobile phone 1300 further includes operating buttons 1302, a receiver 1303, and a transmitter 1304.

4. Electronic Paper

Figure 11:
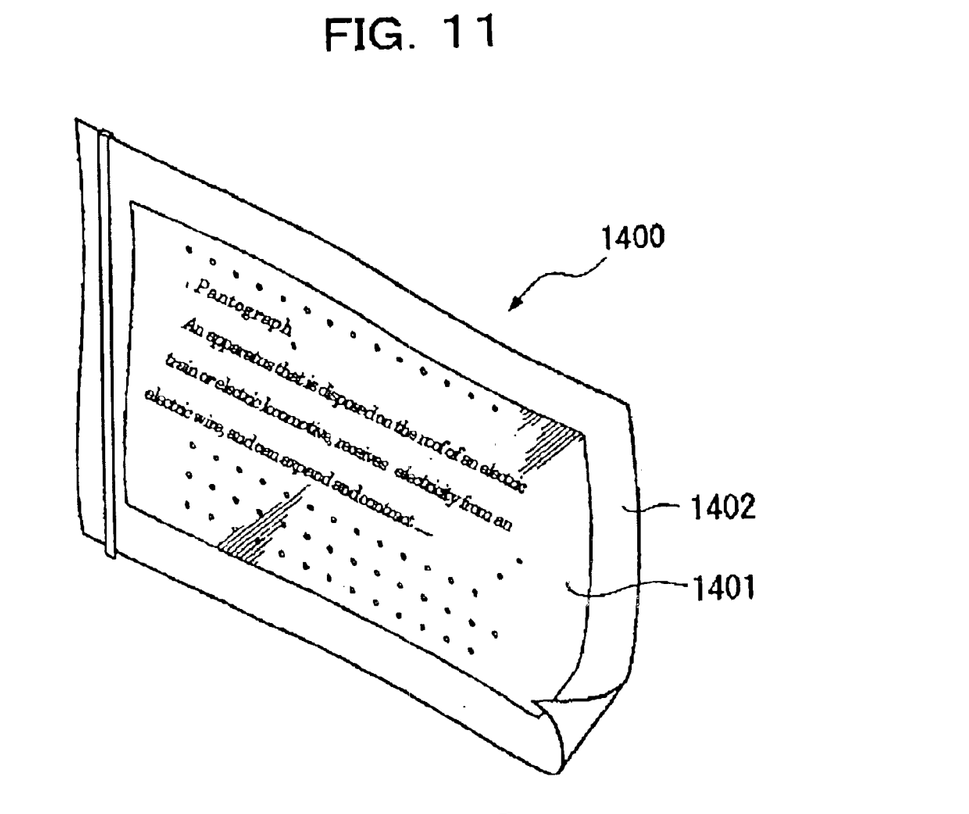
FIG. 11 is an illustration showing an electronic device including an electrophoretic device.

A sheet of exemplary flexible electronic paper 1400 including an electrophoretic device of the present invention is illustrated below. FIG. 11 is a perspective view showing a configuration of the electronic paper 1400 including a display portion 1401 having the electronic device. The electronic paper 1400 further includes a main body 1402 comprising a rewritable sheet having the same texture and flexibility as those of conventional paper.

Figure 12:
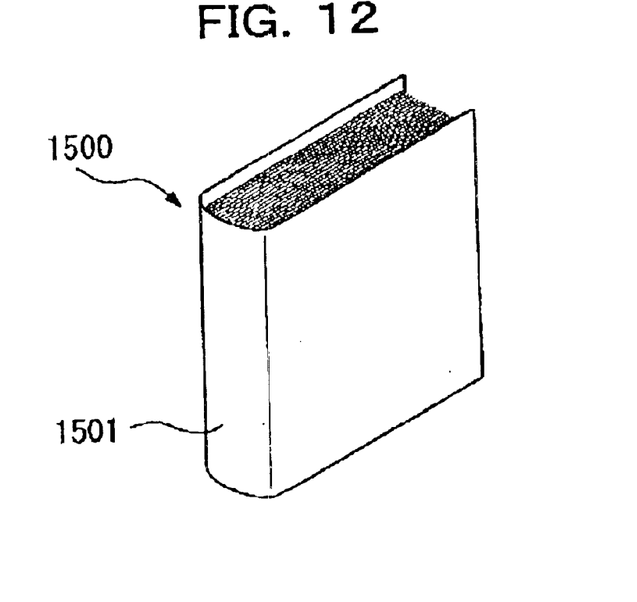
FIG. 12 is an illustration showing an electronic device including an electrophoretic device.

FIG. 12 is a perspective view showing a configuration of an electronic notebook 1500 including a cover 1501 and a plurality of sheets of the electronic paper 1400, shown in FIG. 11, bound with the cover 1501. The cover 1501 includes, for example, a display data-input means, which is not shown, for inputting display data transmitted from external apparatus. Thereby, display contents can be changed or renewed depending on the display data while the sheets of the electronic paper 1400 are bound with the cover 1501.

5. Display System

Figure 13:
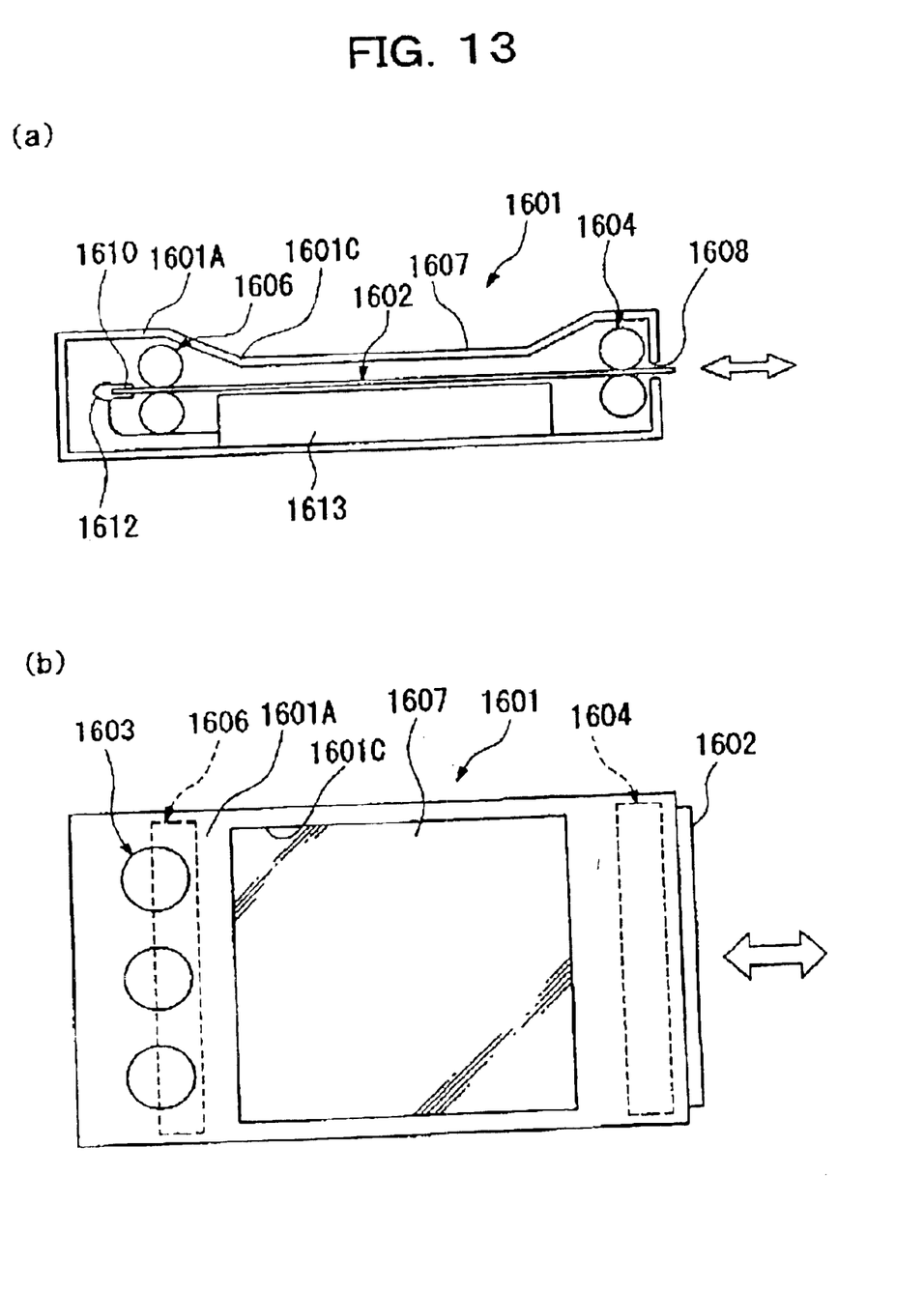
FIG. 13 is an illustration showing an electronic device including an electrophoretic device.

An exemplary display system 1601, shown in FIGS. 13(a) and 13(b), including an electrophoretic device of the present invention is illustrated below. The display system 1601 includes a frame 1601A, a display unit 1602 detachably fixed to the frame 1601A, first and second conveying rollers 1604 and 1606, a glass substrate 1607, a socket 1612, and a controller 1613. The display unit 1602 is an extremely thin sheet, that is, a paper recording medium (so-called electronic paper). The display unit 1602 is retained with the first and second conveying rollers 1604 and 1606 and is disposed at a predetermined position in the frame 1601A. The frame 1601A includes a recessed portion at the center thereof and an opening 1601C, disposed at the recessed portion, having a rectangular shape. The glass substrate 1607 is disposed on the opening 1601C. The frame 1601A further includes an inlet/outlet portion 1608 for allowing the display unit 1602 to pass through. The display unit 1602 includes a terminal unit 1610 at the leading end thereof in the insertion direction. The terminal unit 1610 is electrically connected to the socket 1612 in the frame 1601A. Thereby, the terminal unit 1610 is electrically connected to the controller 1613 disposed at a predetermined position in the frame 1601A.

The detachable display unit 1602 is excellent in portability and can be easily handled because the display unit 1602 has a small thickness and is not therefore bulky. Thus, it is possible to carry only the display unit 1602 while the display unit 1602 displays an area of user's destination.

In addition to the above applications, an electrophoretic device of the present invention can be used for a display portion of the following electronic devices: liquid crystal TVs, viewfinder-type or monitor-type video tape recorders, car navigation systems, pagers, electronic notebooks, portable electronic calculators, word processors, workstations, video phones, POS terminals, apparatuses having a touch panel.

[Advantages]

As described above, an electrophoretic dispersion of the present invention includes a liquid dispersion media and electrophoretic particles, dispersed in the liquid dispersion media, including at least coloring means, a resin portion, and a plurality of hollow microcapsules. According to such a configuration, the density of the electrophoretic particles can be readily adjusted by a simple method, thereby greatly improving the image-retention characteristics.

In the above electrophoretic dispersion, the electrophoretic particles further include charge control portions. According to such a configuration, the electrophoretic particles can have desired polarity and a desired amount of a charge, thereby obtaining excellent electrophoresis.

In the electrophoretic dispersion, the electrophoretic particles consist of at least first and second particles, and at least one of the group consisting of the color of the coloring means, the material of the resin portion, and the kind of the charge control portions of the first particles is different from that of the second particles. According to such a configuration, a grayshaded or color image can be displayed, that is, display variations can be increased.

An electrophoretic device of the present invention includes a pair of electrodes and an electrophoretic dispersion disposed between the electrodes or microcapsules, disposed between the electrodes, containing the above electrophoretic dispersion. According to such a configuration, the settlement of the electrophoretic particles is prevented, thereby displaying a stable image.

What is claimed is:

1. An electrophoretic dispersion, comprising:
   a liquid dispersion media; and
   electrophoretic particles, dispersed in the liquid dispersion media, at least one electrophoretic particle including at least a coloring portion, a resin portion, and a plurality of hollow microcapsules distributed in the at least one electrophoretic particle.

2. The electrophoretic dispersion according to claim 1, the at least one electrophoretic particle further including charge control portions.

3. The electrophoretic dispersion according to claim 1, the electrophoretic particles including at least first and second particles, at least one first particle and at least one second particle each have at least a coloring portion, a resin portion, a plurality of hollow microcapsules, and charge control portions, and at least one of a color of the coloring portion, a material of the resin portion, and a kind of the charge control portions of the at least one first particle being different from that of the at least one second particle.

4. The electrophoretic dispersion according to claim 1, the hollow microcapsules having a same function as that of the coloring portion.

5. An electrophoretic device, comprising:
   a pair of electrodes; and
   the electrophoretic dispersion being disposed between the electrodes, according to claim 1.

6. An electrophoretic device, comprising:
   a pair of electrodes; and
   microcapsules, disposed between the electrodes, containing the electrophoretic dispersion according to claim 1.

7. An electronic device comprising the electrophoretic device according to claim 5.

* * * * *